United States Patent
Umehara et al.

(10) Patent No.: US 11,807,288 B2
(45) Date of Patent: Nov. 7, 2023

(54) RIDING VEHICLE

(71) Applicant: AISIN CORPORATION, Aichi (JP)

(72) Inventors: Hideyuki Umehara, Kariya (JP); Toshihiko Ishida, Kariya (JP)

(73) Assignee: AISIN CORPORATION, Kariya (JP)

( * ) Notice: Subject to any disclaimer, the term of this patent is extended or adjusted under 35 U.S.C. 154(b) by 530 days.

(21) Appl. No.: 17/022,552

(22) Filed: Sep. 16, 2020

(65) Prior Publication Data

US 2021/0094602 A1 Apr. 1, 2021

(30) Foreign Application Priority Data

Sep. 27, 2019 (JP) .................... 2019-177343

(51) Int. Cl.
*B62K 13/08* (2006.01)
*B62B 3/02* (2006.01)
*B62B 7/12* (2006.01)
*B62J 1/16* (2006.01)

(52) U.S. Cl.
CPC ................ *B62B 7/12* (2013.01); *B62B 3/02* (2013.01); *B62K 13/08* (2013.01); *B62B 2206/003* (2013.01); *B62J 1/167* (2013.01)

(58) Field of Classification Search
CPC ...... B62B 3/02; B62B 2206/003; B62K 13/08
See application file for complete search history.

(56) References Cited

U.S. PATENT DOCUMENTS

| | | | | |
|---|---|---|---|---|
| 11,414,119 | B1 * | 8/2022 | Morgan | B62B 5/0016 |
| 2008/0217875 | A1 | 9/2008 | Barak et al. | |
| 2018/0015978 | A1 * | 1/2018 | Delgatty | B62K 25/04 |
| 2020/0339024 | A1 * | 10/2020 | Ishida | B62K 13/08 |

FOREIGN PATENT DOCUMENTS

| | | | | |
|---|---|---|---|---|
| CN | 101870321 | A | 10/2010 | |
| CN | 108068957 | A * | 5/2018 | |
| CN | 111016988 | A * | 4/2020 | |
| JP | 2002-225718 | A | 8/2002 | |
| JP | 2004-17949 | A | 1/2004 | |
| JP | 2005-193740 | A | 7/2005 | |
| JP | 2005193740 | A * | 7/2005 | ............... B62K 5/10 |
| JP | 2009-521352 | A | 6/2009 | |
| JP | 2012-162103 | A | 8/2012 | |
| JP | 2017-039401 | A | 2/2017 | |
| JP | 2019107970 | A * | 7/2019 | ............... B62B 3/00 |
| WO | WO-2020171761 | A1 * | 8/2020 | ............... B62B 3/02 |
| WO | WO-2022224238 | A1 * | 10/2022 | |

OTHER PUBLICATIONS

U.S. Appl. No. 16/853,843, filed Apr. 21, 2020, Ishida, et al.

* cited by examiner

*Primary Examiner* — Kevin Hurley
*Assistant Examiner* — Hosam Shabara
(74) *Attorney, Agent, or Firm* — Oblon, McClelland, Maier & Neustadt, L.L.P.

(57) ABSTRACT

A riding vehicle includes: a main body portion supporting a wheel; a seat stay erected on the main body portion and configured to be switched between a riding state in which a person rides and a cart state in which a person does not ride; a seat fixed to an upper side of the seat stay; a frame provided on the seat stay and configured to hold luggage in the riding state and the cart state; a steering stay erected on the main body portion at an interval with respect to the seat stay in a traveling direction; and a handle provided on the steering stay, in which the frame, in the cart state, exists in a region closer to the handle as compared with that in the riding state.

12 Claims, 12 Drawing Sheets

RIDING VEHICLE

CROSS REFERENCE TO RELATED APPLICATIONS

This application is based on and claims priority under 35 U.S.C. § 119 to Japanese Patent Application 2019-177343, filed on Sep. 27, 2019, the entire content of which is incorporated herein by reference.

TECHNICAL FIELD

This disclosure relates to a riding vehicle.

BACKGROUND DISCUSSION

In related art, as a riding vehicle, for example, one described in JP 2002-225718A (Reference 1) is known. This riding vehicle can be switched not only to a riding state in which a person is riding and traveling, but also to a cart state in which luggage is loaded in a rack and traveling by replacing a seat on which the person sits with the rack. Further, by providing the rack close to a handle, the luggage can be loaded in the rack while the handle is operated.

However, in Reference 1, since it is necessary to remove the seat when the luggage is loaded, a person cannot ride and travel in a state in which the luggage is loaded. For this reason, for example, when the riding vehicle is ridden to go out and the luggage is loaded in the rack at an outside destination, it is not possible to ride the riding vehicle to go home.

A need thus exists for a riding vehicle which is not susceptible to the drawback mentioned above.

SUMMARY

A riding vehicle includes: a main body portion supporting a wheel; a seat stay erected on the main body portion and configured to be switched between a riding state in which a person rides and a cart state in which a person does not ride; a seat fixed to an upper side of the seat stay; a frame provided on the seat stay and configured to hold luggage in the riding state and the cart state; a steering stay erected on the main body portion at an interval with respect to the seat stay in a traveling direction; and a handle provided on the steering stay. The frame, in the cart state, exists in a region closer to the handle, as compared with that in the riding state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Figure 1:
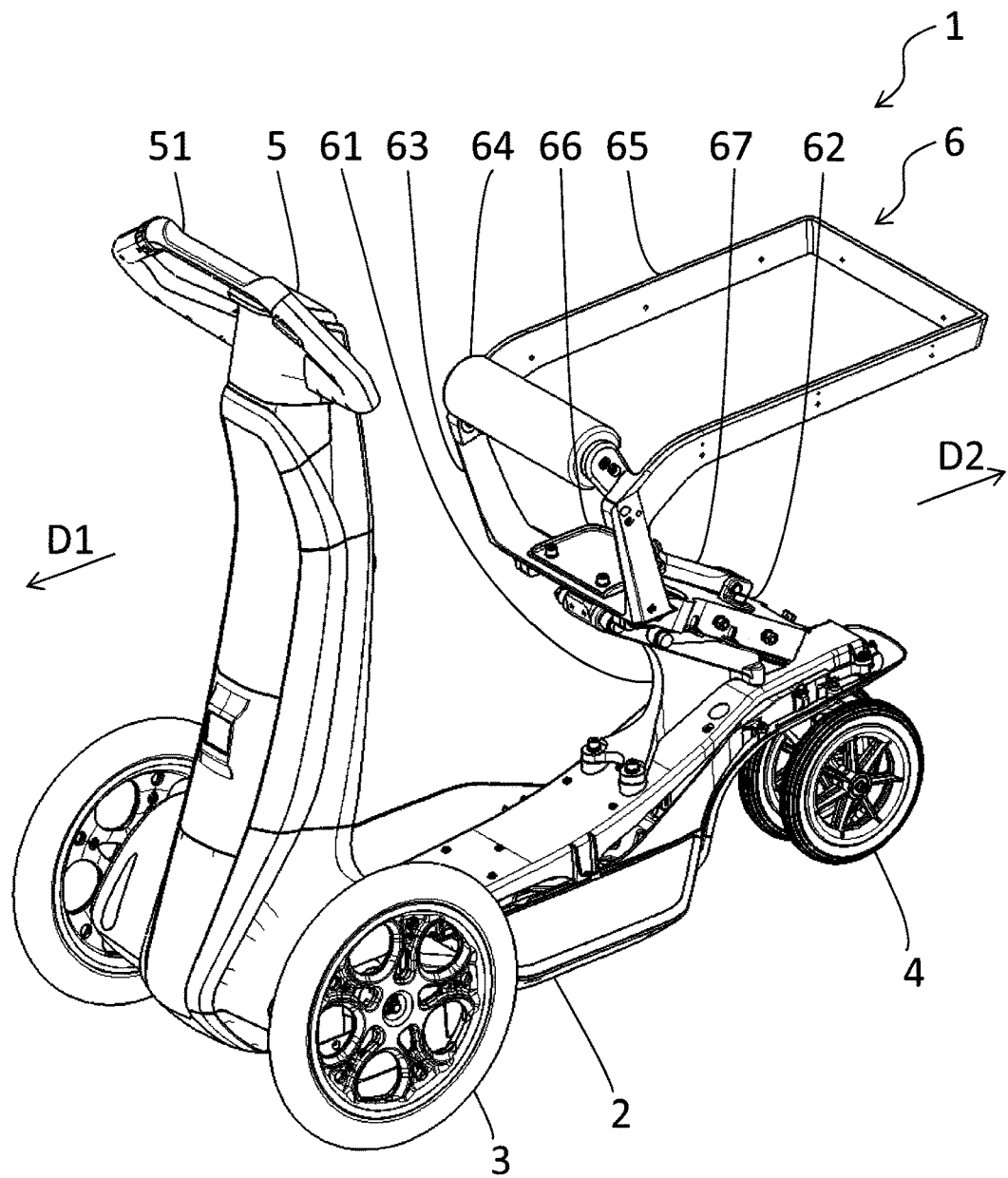
FIG. 1 is a perspective view showing an example of a configuration of a riding vehicle according to a first embodiment.
Figure 2:
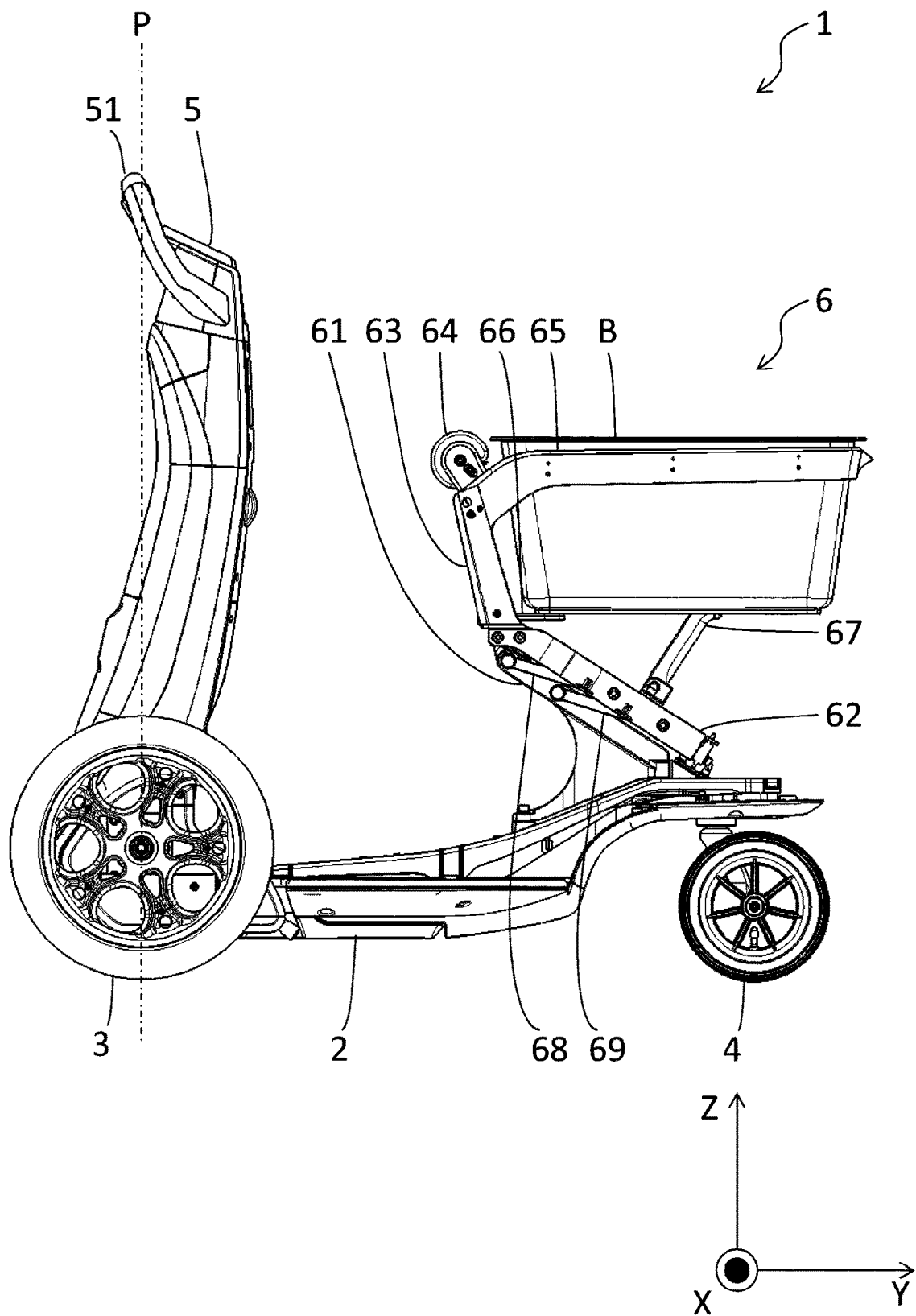
FIG. 2 is a side view showing an example of a configuration of a riding state of the riding vehicle holding luggage according to the first embodiment.
Figure 3:
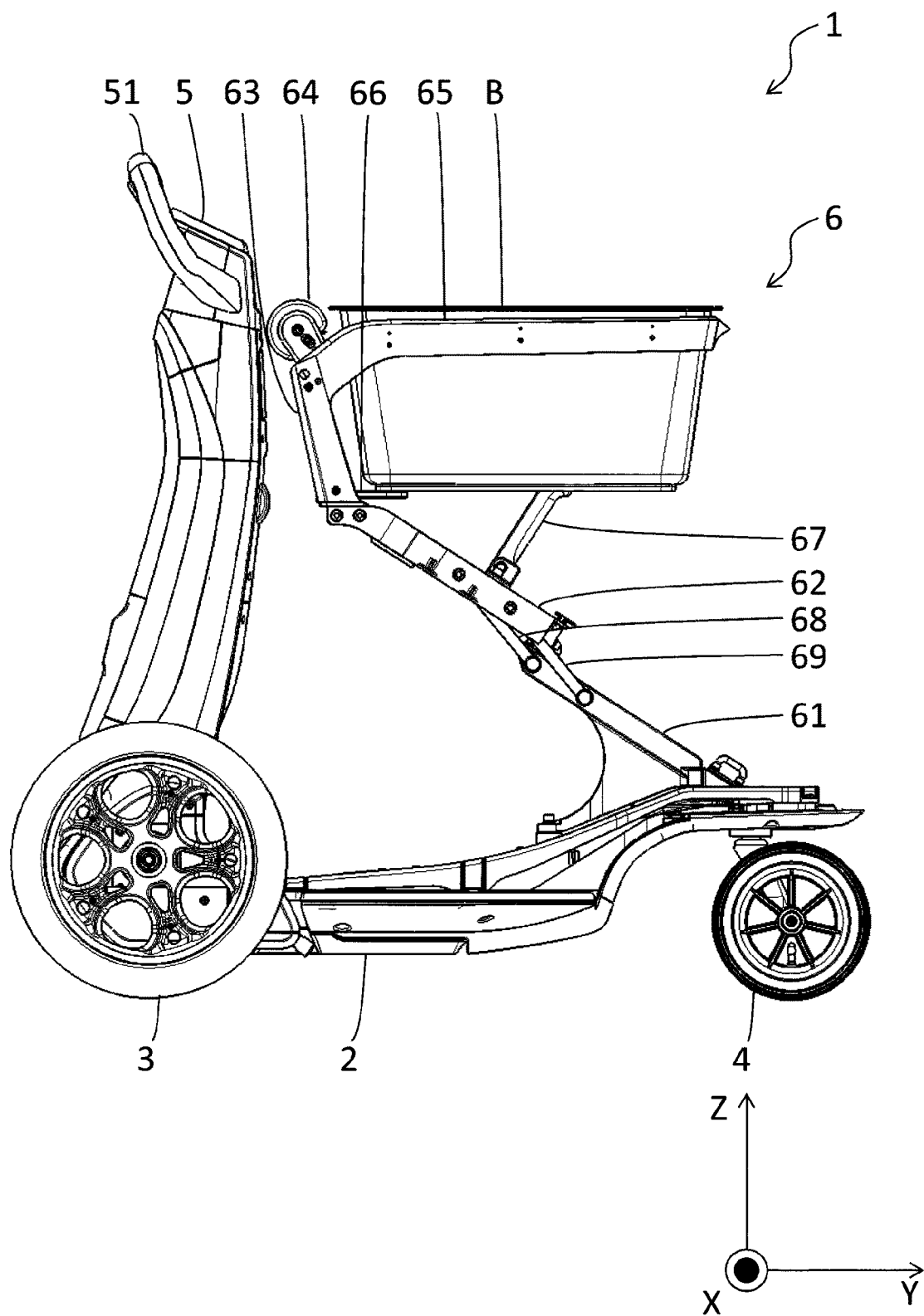
FIG. 3 is a side view showing an example of a configuration of a cart state of the riding vehicle holding the luggage according to the first embodiment.
Figure 4:
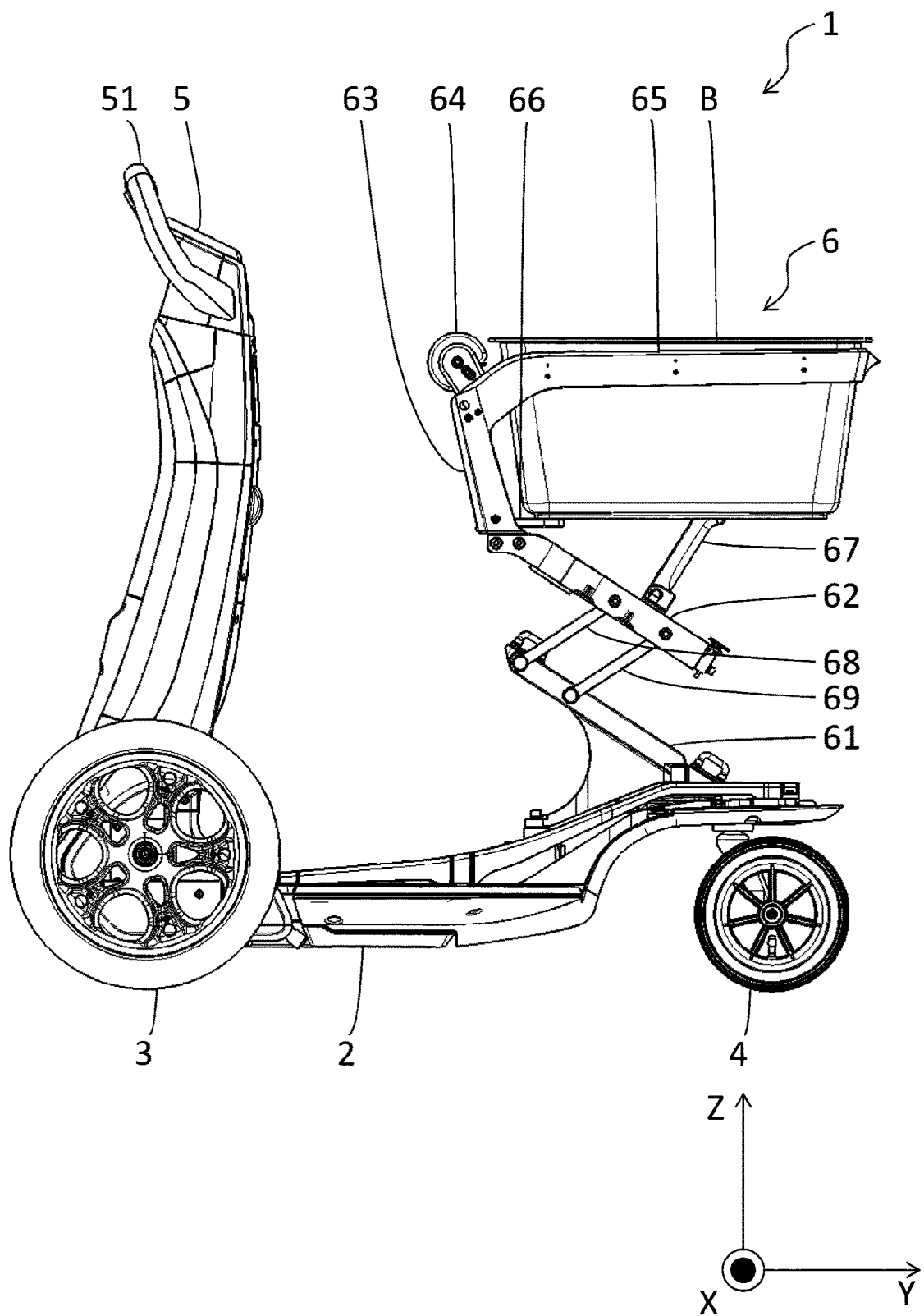
FIG. 4 is a side view showing an example of a configuration during switching between the riding state and the cart state of the riding vehicle holding the luggage according to the first embodiment.
Figure 5:
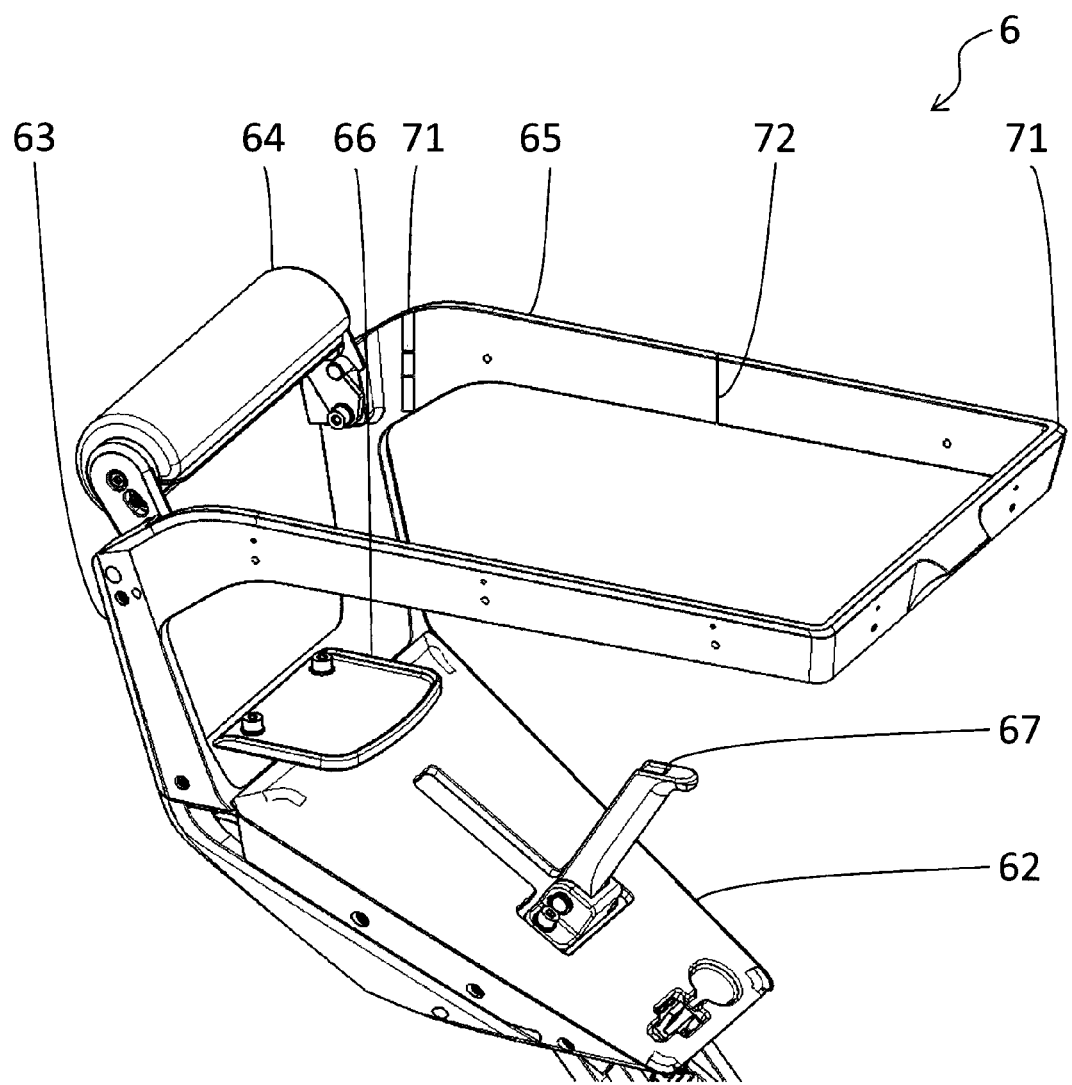
FIG. 5 is a perspective view showing an example of a configuration of a seat stay according to the first embodiment.

FIG. 1 is a perspective view showing an example of a configuration of a riding vehicle 1 according to the first embodiment. FIG. 2 is a side view showing an example of a configuration of a riding state of the riding vehicle 1 holding luggage B according to the first embodiment. FIG. 3 is a side view showing an example of a configuration of a cart state of the riding vehicle 1 holding the luggage B according to the first embodiment. FIG. 4 is a side view showing an example of a configuration during switching between the riding state and the cart state of the riding vehicle 1 holding the luggage B according to the first embodiment. FIG. 5 is a perspective view showing an example of a configuration of a seat stay 6 according to the first embodiment. In the figure, an X axis corresponds to a vehicle width direction of the riding vehicle 1, a Y axis corresponds to a traveling direction of the riding vehicle 1, and a Z axis corresponds to a height direction of the riding vehicle 1.

As shown in FIG. 1, the riding vehicle 1 according to the present embodiment includes a main body portion 2, first wheels (wheel) 3, second wheels 4, a steering stay 5, and a seat stay 6.

The main body portion 2 supports the first wheels 3 and the second wheels 4. The steering stay 5 and the seat stay 6 are erected on the main body portion 2 at an interval in the traveling direction.

The first wheels 3 have two wheels and are individually driven to rotate by a pair of electric motors (not shown). The riding vehicle 1 can travel straight along the traveling direction by both electric motors driving the two first wheels 3 to rotate at a same rotation speed. For example, the riding vehicle 1 travels straight in a traveling direction (hereinafter, also referred to as "forward traveling direction D1") in which the first wheel 3 precedes with respect to the second wheel 4 by the two electric motors rotating forward at the same rotation speed. In contrast, the riding vehicle 1 travels straight in a traveling direction (hereinafter, also referred to as "reverse traveling direction D2") in which the first wheel 3 follows the second wheel 4 by the two electric motors rotating reversely at the same rotation speed. Further, the riding vehicle 1 can turn in the traveling direction by both electric motors driving the two first wheels 3 to rotate them at rotation speeds different from each other. Only the second wheel 4 or both the first wheel 3 and the second wheel 4 may be driven to rotate by the electric motor. Further, the riding vehicle may be travelled manually without the electric motor.

The steering stay 5 stands upright between the first wheels 3, and on an upper side of the steering stay 5, a loop-shaped handle 51 that extends upward and on both sides in the vehicle width direction (a direction parallel to the X axis) is provided. The handle 51 exists on a vertical plane P that is perpendicular to the traveling direction and passes through a center of the first wheel 3. "On the vertical plane P" also includes "on a substantially vertical plane P", and the handle 51 may exist in a position where, in the riding state, a hand of a person who sits on a seat 64 can reach the handle 51, and in the cart state, the person who walks beside the riding vehicle can operate the handle 51 at a position where a foot of the person does not hit the riding vehicle 1.

The seat stay 6 stands upright in a direction slightly closer to the steering stay 5 than a position of the second wheel 4 in the traveling direction, that is, a position displaced in the forward traveling direction D1.

The seat stay 6 includes a fixing portion 61, a movable portion 62, a support portion 63, the seat 64, a frame 65, a first luggage support 66, a second luggage support 67, a first link 68, and a second link 69.

The fixing portion 61 is connected to the main body portion 2 and extends toward the handle 51.

The movable portion 62 is relatively movable with respect to the fixing portion 61 integrally with the support portion 63, the seat 64, the frame 65, the first luggage support 66, and the second luggage support 67. The movable portion 62 and the frame 65 are switched between the riding state in which the movable portion 62 and the frame 65 exist in a region close to the second wheel 4 shown in FIG. 2 and the cart state in which the movable portion 62 and the frame 65 exist in a region close to the handle 51 shown in FIG. 3. Thrust when switching between the riding state and the cart state includes, for example, human power, electric power, or the like.

The movable portion 62 has a mechanism that holds the riding state and the cart state. The mechanism includes, for example, a snatch lock, a plunger, or the like. The mechanism that holds the movable portion 62 may be provided during switching between the riding state and the cart state. As a result, a height of the seat 64 can be adjusted according to a body height, and when the luggage B is unloaded, the height can be adjusted according to a moving destination.

The support portion 63 extends upward from the movable portion 62. The support portion 63 connects the seat 64, the frame 65, and the movable portion 62, and switches between the riding state and the cart state integrally with the movable portion 62.

The seat 64 extends in the vehicle width direction and is fixed to the support portion 63. The seat 64 restricts one direction of a side surface of the loaded luggage B. The seat 64 is preferably a cushion (a material that elastically deforms). But, the seat 64 may be a rigid body such as resin or metal.

The frame 65 is formed in a U shape and is fixed to the support portion 63. The frame 65 restricts three directions of the side surfaces of the loaded luggage B. As shown in FIG. 5, one side of the frame 65 has an opening portion 72 opened in the vehicle width direction by a hinge 71. The opening direction is not limited to the vehicle width direction, and the opening direction may be a direction parallel to the Y axis or a direction parallel to the Z axis. By opening one side of the frame 65 that restricts the side surface of the luggage B, the luggage B can be moved in a horizontal direction.

The first luggage support 66 extends in the horizontal direction above the movable portion 62 and supports a bottom portion of the loaded luggage B. The second luggage support 67 is formed at a center of the movable portion 62 and supports a center of the bottom portion of the loaded luggage B. As shown in FIG. 5, the second luggage support 67 may be formed to be capable of accommodating in the movable portion 62. In addition, when the first luggage support 66 and the second luggage support 67 are not provided, the luggage B may be loaded by hooking the luggage B on the frame 65.

One end of each of the first link 68 and the second link 69 is rotatably supported on the fixing portion 61, and another end of each of the first link 68 and the second link 69 is rotatably supported on the movable portion 62. With a link mechanism constituted by the first link 68 and the second link 69, the movable portion 62 switches between the riding state and the cart state while keeping the movable portion 62 parallel to the fixing portion 61. As a result, the riding state and the cart state are switched while the luggage B is kept at a level parallel to ground. Further, while the riding state and the cart state are switched, the seat stay 6 passes through a highest reaching point of the seat stay 6 in a vertical direction. The first link 68 and the second link 69 are examples of the mechanism that switches between the riding state and the cart state, and a mechanism in which the movable portion 62 slides linearly along the fixing portion 61, or the like, may be used.

In the riding state, an operator rides on the main body portion 2, operates the handle 51 while sitting on the seat 64, and travels in the forward traveling direction D1.

In the cart state, the operator stands in front of the steering stay 5 from an opposite side to the second wheel 4, operates the handle 51, and travels in the reverse traveling direction D2.

As described above, at least the following effects can be obtained according to the present embodiment.

Switching between the riding state and the cart state is performed. In the riding state, the luggage B can be loaded while a person rides. Since the frame 65 that holds the luggage B is provided close to the handle 51 in the cart state, the luggage B can be loaded while the handle 51 is operated. In detail, a basket or the like can be loaded on the frame 65, or items to be accommodated or the like can be loaded (accommodated) in a basket.

By extending the fixing portion 61 towards the handle 51, since the frame 65 that holds the luggage B is provided closer to the handle 51 in the cart state, the luggage B can be loaded while the handle 51 is operated.

Since the handle 51 exists on the vertical line P passing through the center of the first wheel 3 or on the substantially vertical line P, in the riding state, the hand of the person who sits on the seat 64 can reach the handle 51, and in the cart state, the person who walks beside the riding vehicle can operate the handle 51 at the position where the foot of the person does not hit the riding vehicle 1. It is possible to switch between the riding state and the cart state by only switching a state of the seat stay 6 without changing a position of the handle 51.

By using the link mechanism, when switching between the riding state and the cart state, it is necessary to move the seat stay 6 against gravity up to the highest reaching point thereof. That is, since the gravity is applied in a direction in which each state is held, the riding state and the cart state can be held more firmly. Specifically, when shifting to the riding state or the cart state and after reaching the highest reaching point, the gravity applied to the seat stay 6 acts in a direction to complete the shifting. Further, the gravity applied to the seat stay 6 acts in a holding direction even when the riding state or the cart state is held. Therefore, a lock mechanism for holding the riding state or the cart state can be downsized and simplified.

By opening the frame 65 in the horizontal direction, the luggage can also be moved in the horizontal direction, and when the loaded baggage B is moved to an outside of the riding vehicle 1, it is not necessary to lift the baggage B to a position beyond the frame 65.

By using the mechanism in which the movable portion 62 slides linearly along the fixing portion 61, a movement amount between the riding state and the cart state can be reduced and the state can be changed with a small momentum.

During switching between the riding state and the cart state, by providing the mechanism holding the movable portion 62, the height of the seat 64 can be adjusted according to the body height, and when the luggage B is unloaded, the height can be adjusted according to the moving destination.

By providing the first luggage support 66 and the second luggage support 67 that supports the bottom portion of the luggage B, the luggage B is supported by the first luggage support 66 and the second luggage support 67, and since movement in the horizontal direction is limited by the frame 65, the luggage B can be loaded in a stable state.

Second Embodiment

Figure 6:
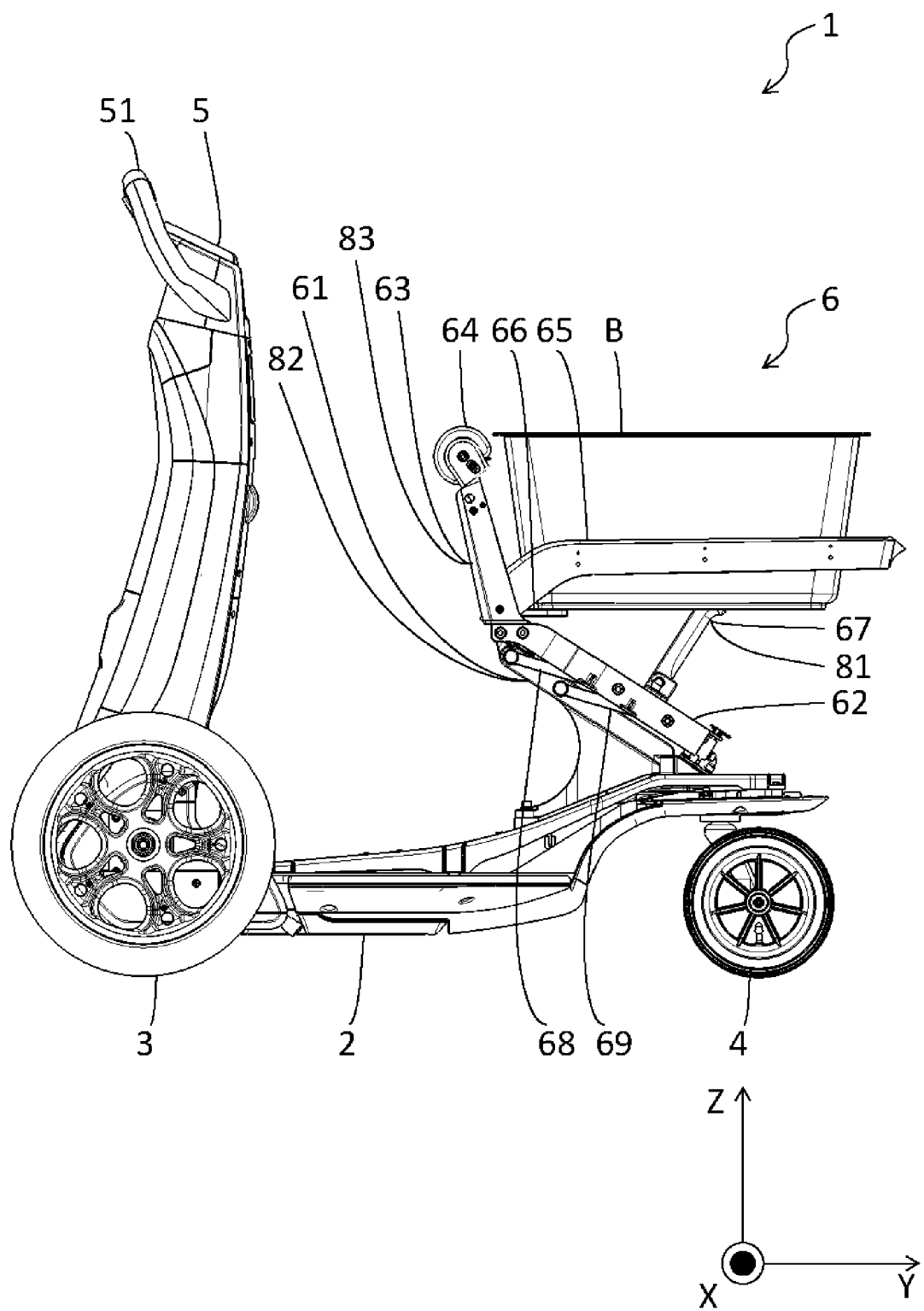
FIG. 6 is a side view showing an example of a configuration in which a frame of a riding vehicle holding luggage according to a second embodiment has been lowered.
Figure 7:
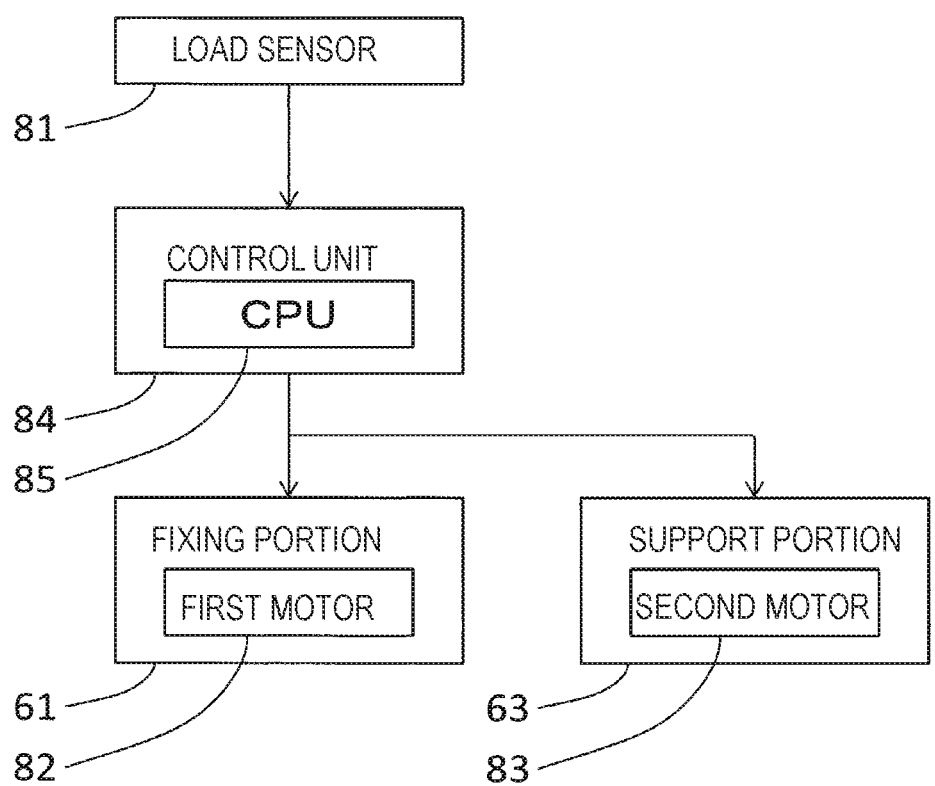
FIG. 7 is a block diagram showing an example of a control unit or the like of the riding vehicle according to the second embodiment.
Figure 8:
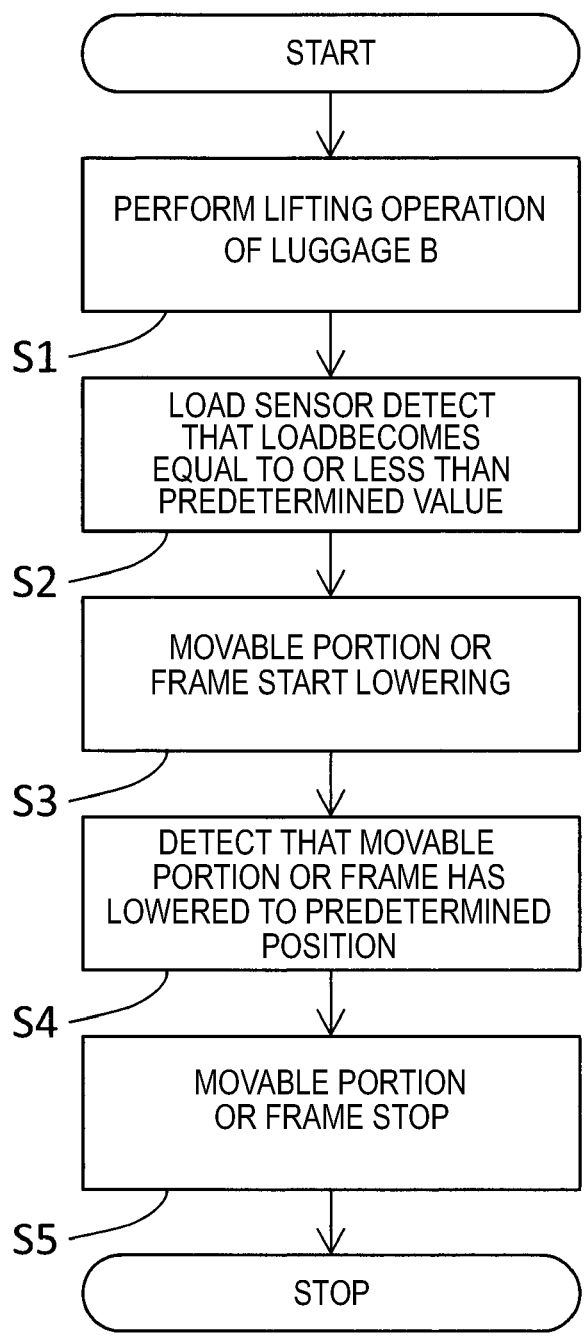
FIG. 8 is a flowchart showing an example of a flow of a process executed by the control unit when a load sensor of the riding vehicle according to the second embodiment detects a change in a load.

FIG. 6 is a side view showing an example of a configuration in which the frame 65 of the riding vehicle 1 holding the luggage B according to the second embodiment has been lowered. FIG. 7 is a block diagram showing an example of a control unit 84 or the like of the riding vehicle 1 according to the second embodiment. FIG. 8 is a flowchart showing an example of a flow of a process executed by the control unit 84 when a load sensor 81 of the riding vehicle 1 according to the second embodiment detects a change in a load.

Only configuration of the second embodiment different from that of the first embodiment will be described. The second embodiment is different in that the movable portion 62 or the frame 65 automatically raises and lowers.

The riding vehicle 1 according to the present embodiment includes a load sensor 81, a first motor 82, a second motor 83, and the control unit 84.

The load sensor 81 is provided on the second luggage support 67. In order to determine whether or not the luggage B of the riding vehicle 1 is lifted, the load sensor 81 detects a load and outputs a signal to the control unit 84. The load sensor 81 is an example of a sensor, and a proximity sensor or the like may be used. The sensors such as the load sensor 81 may be provided on the frame 65, the first luggage support 66, or the like.

The first motor 82 and the second motor 83 are respectively provided on the fixing portion 61 and the support portion 63, and respectively raise and lower the movable portion 62 and the frame 65 along a slider (not shown). The first motor 82 and the second motor 83 may be provided in the movable portion 62 or the frame 65. It should be noted that instead of the slider, a link mechanism or the like may be used to raise and lower.

The control unit 84 has a central processing unit (CPU) 85. The control unit 84 processes the output signal from the load sensor 81 by the CPU 85, and outputs a signal for energizing the first motor 82 or the second motor 83. Instead of the CPU 85, another logical operation processor such as a digital signal processor (DSP), a logic circuit, or the like may be used.

A process executed by the control unit 84 when the load sensor 81 detects the change in the load will be described with reference to the flowchart shown in FIG. 8.

As shown in FIG. 8, a lifting operation of the luggage B is performed (step S1). The load sensor 81 detects that the load becomes equal to or less than a predetermined value (step S2). For example, the predetermined value is set between 0 and a load of the basket. The control unit 84 energizes the first motor 82 or the second motor 83, and the movable portion 62 or the frame 65 starts lowering (step S3). A sensor or the like detects that the movable portion 62 or the frame 65 has lowered to a predetermined position (step S4). The control unit 84 stops energizing the first motor 82 or the second motor 83, and the movable portion 62 or the frame 65 stops moving (step S5). Then, the luggage B is moved to the outside of the frame 65. By pressing a button (not shown), the movable portion 62 or the frame 65 returns to a position before lowering.

By performing the control as described above, when the loaded luggage B is moved to the outside of the riding vehicle 1, it is necessary to lift the luggage B to a position beyond the frame 65, but a lifting distance can be shortened by automatically lowering the movable portion 62 or the frame 65. The movable portion 62 or the frame 65 may be lowered at the same time.

Another Embodiment

Although the embodiments disclosed here have been described above, the disclosure is not limited to the embodiments described above, and various modifications can be made without departing from the scope disclosed here.

Figure 9:
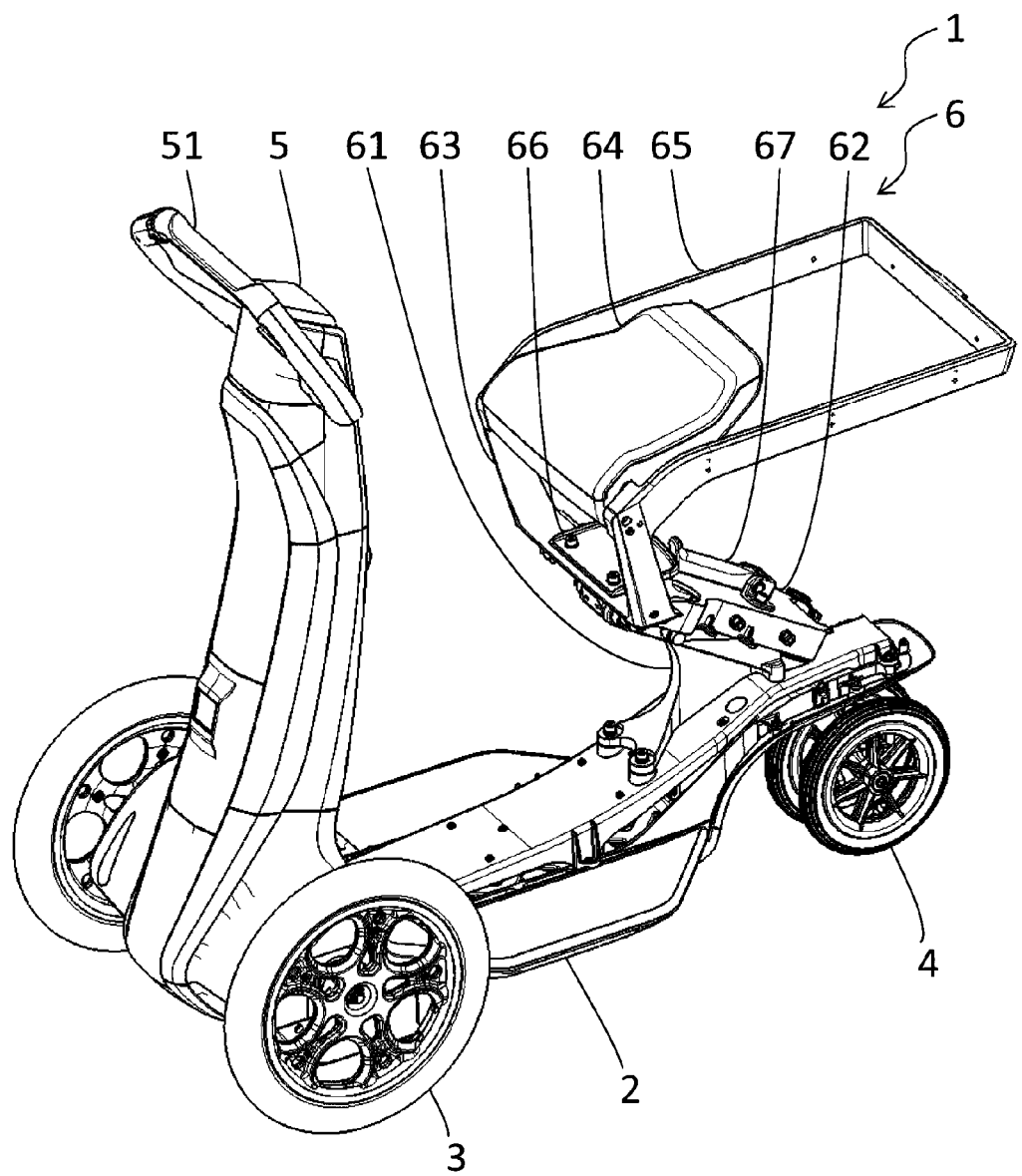
FIG. 9 is a perspective view showing an example of a configuration of a riding vehicle according to another embodiment.
Figure 9:
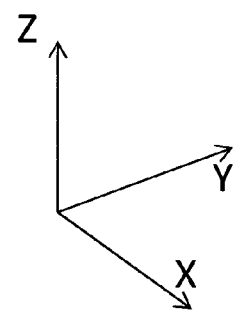
Figure 10:
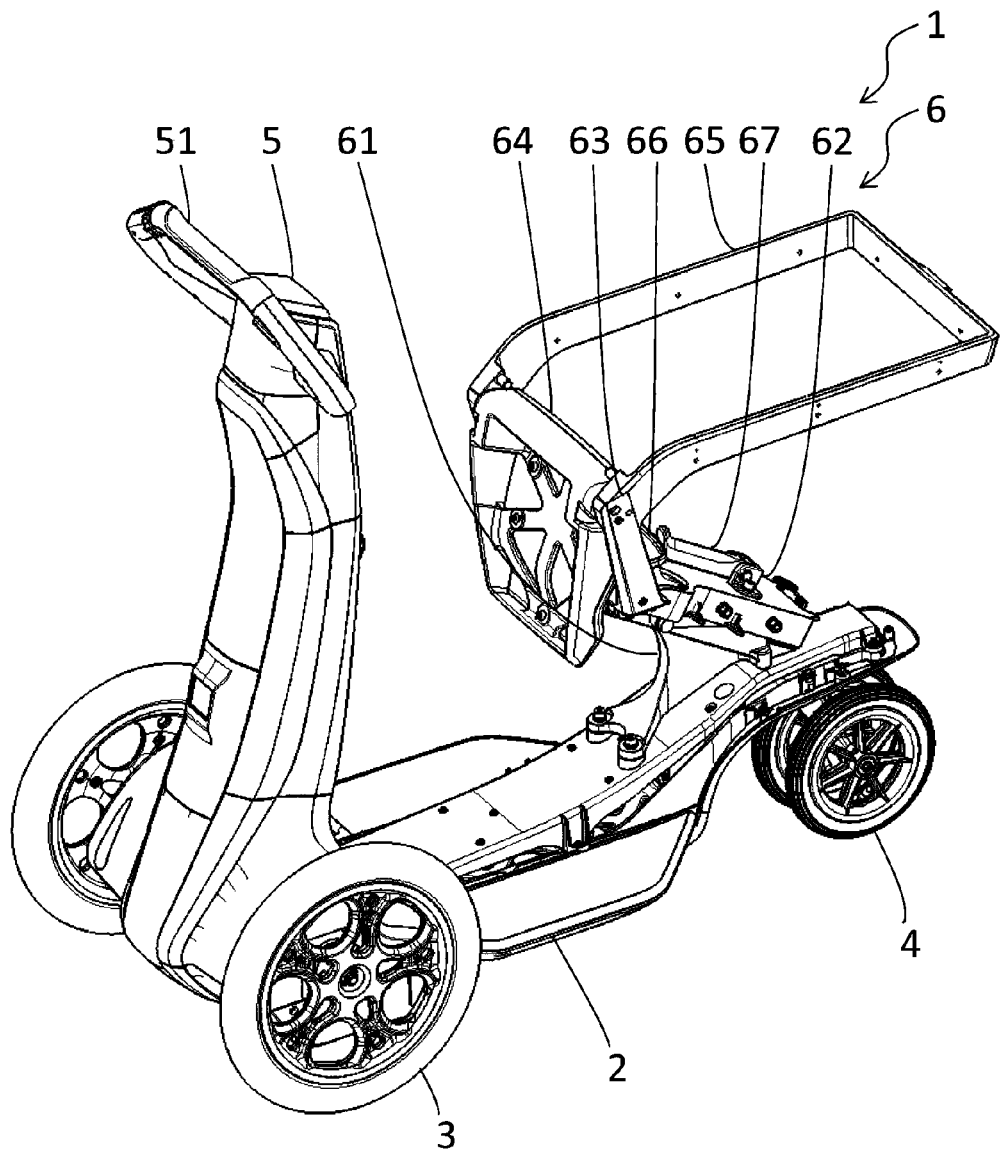
FIG. 10 is a perspective view showing an example of a configuration of the riding vehicle when luggage is loaded according to the other embodiment.

For example, as shown in FIG. 9, the seat 64 is extended to a space that loads the luggage B, and when the luggage B is loaded, the seat may be folded as shown in FIG. 10. When the luggage B is not loaded, a contact area between the person and the seat 64 can be increased and comfort can be improved. When the luggage B is loaded, the luggage B can be loaded while a person rides by standing upright without sitting on the seat 64.

Figure 11:
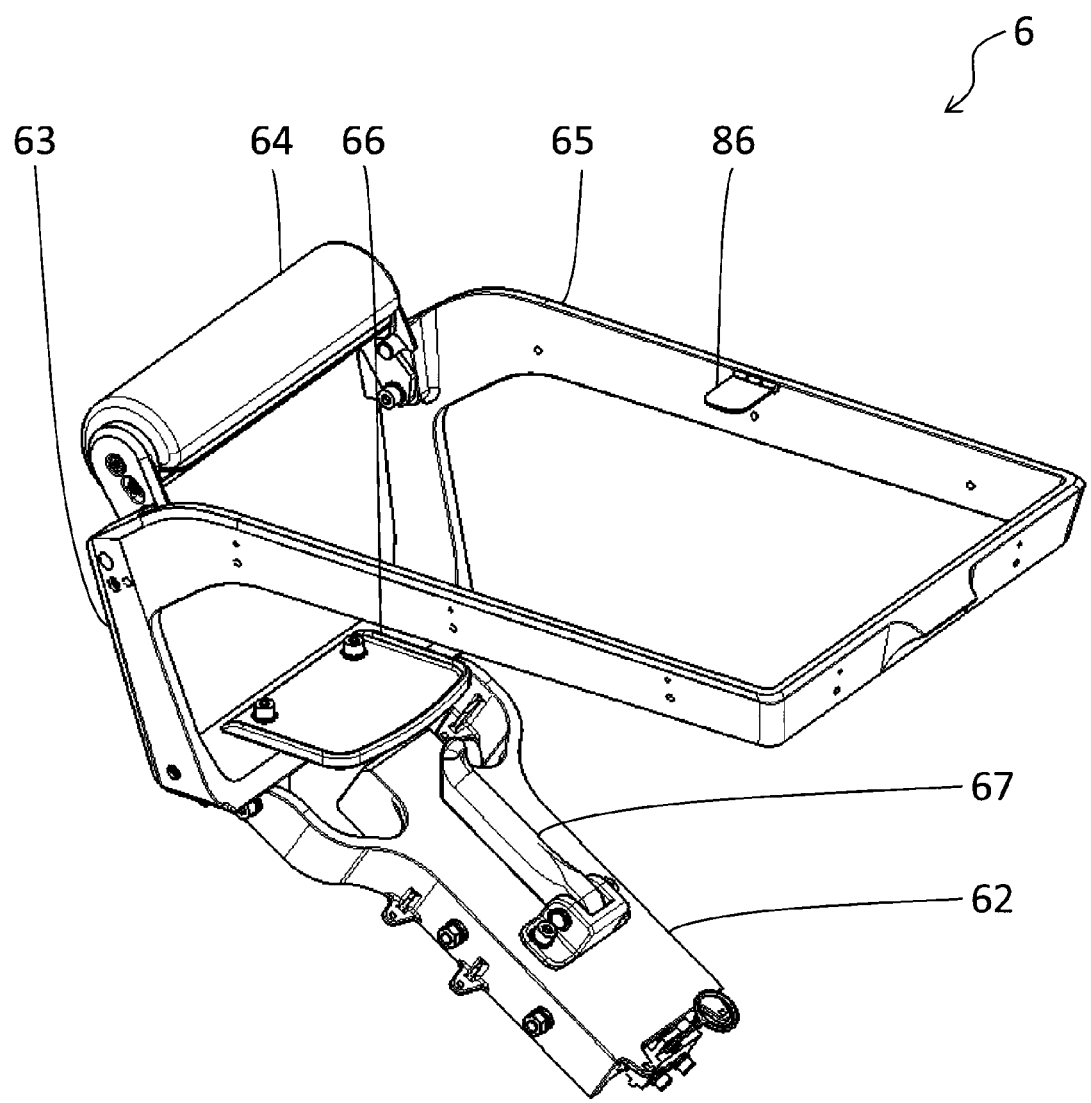
FIG. 11 is a perspective view showing an example of a configuration of a seat stay according to the other embodiment.
Figure 12:
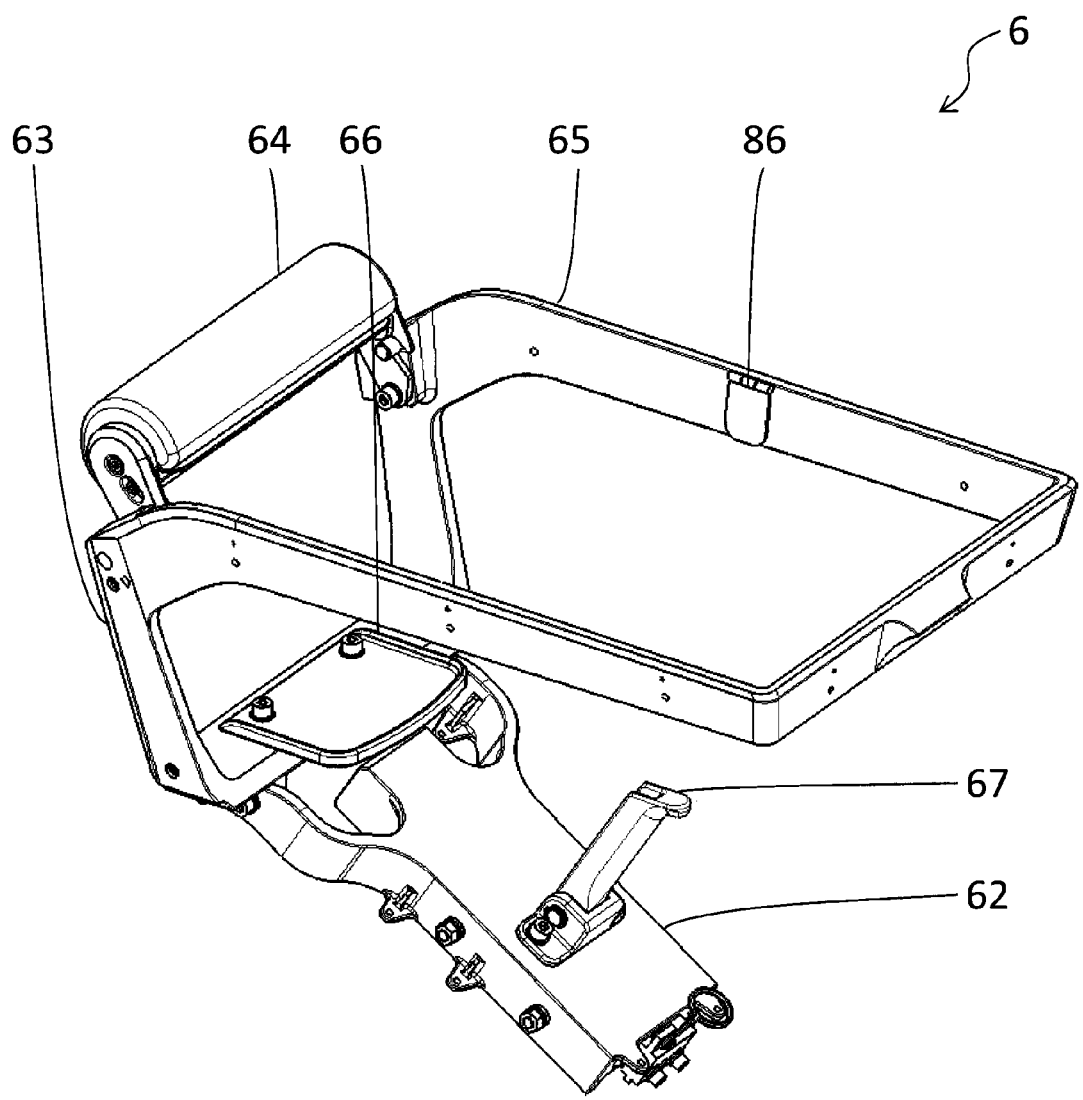
FIG. 12 is a perspective view showing an example of a configuration of the seat stay when a switch is pressed according to the other embodiment.

Further, as shown in FIGS. 11 and 12, a state in which the second luggage support 67 is accommodated and a state in which the luggage B is supported may be switched in association with a switch 86 provided on the frame 65.

When the luggage B is loaded, the switch 86 is pressed and a luggage support is ready to support the luggage B. When the luggage B is removed, the switch 86 returns to an original state, and the second luggage support 67 is in an accommodated state. As a result, the second luggage support 67 can be switched to a state in which the luggage B can be supported even when both hands are occupied when the luggage B is loaded.

Further, a child seat or the like may be attached instead of the frame 65.

A riding vehicle includes: a main body portion supporting a wheel; a seat stay erected on the main body portion and configured to be switched between a riding state in which a person rides and a cart state in which a person does not ride; a seat fixed to an upper side of the seat stay; a frame provided on the seat stay and configured to hold luggage in the riding state and the cart state; a steering stay erected on the main body portion at an interval with respect to the seat stay in a traveling direction; and a handle provided on the steering stay. The frame, in the cart state, exists in a region closer to the handle, as compared with that in the riding state.

According to the above-mentioned configuration, the seat stay is switched between the riding state and the cart state. Further, in the riding state, the luggage can be loaded by the frame while a person rides. Since the frame that holds the luggage is provided close to the handle in the cart state, the luggage can be loaded while the handle is operated.

In the above-mentioned riding vehicle, it is preferable that the seat stay is switched between the riding state and the cart state by a link mechanism, and while the riding state and the cart state are switched, the seat stay passes through a highest reaching point thereof in a vertical direction.

According to the above-mentioned configuration, when switching between the riding state and the cart state, it is necessary to move the seat stay against gravity up to the highest reaching point thereof. That is, since the gravity is applied in a direction (opposite direction to a Z-axis arrow) in which each state is held, the riding state and the cart state can be held more firmly.

In the above-mentioned riding vehicle, it is preferable that a fixing portion provided on the seat stay and connected to the main body portion extends toward the handle.

According to the above-mentioned configuration, since the frame that holds the luggage is provided closer to the handle in the cart state, the luggage can be loaded while the handle is operated.

In the above-mentioned riding vehicle, it is preferable that the handle exists on a vertical plane that is perpendicular to the traveling direction and passes through a center of the wheel or on a substantially vertical plane.

According to the above-mentioned configuration, in the riding state, a hand of the person who sits on the seat can reach the handle, and in the cart state, the person who walks beside the riding vehicle can operate the handle at a position where a foot of the person does not hit the riding vehicle. As a result, it is possible to switch between the riding state and the cart state by only switching a state of the seat stay without changing a position of the handle.

In the above-mentioned riding vehicle, it is preferable that the riding vehicle further includes a sensor configured to detect that the luggage is lifted, a motor configured to raise and lower the frame, and a control unit configured to control the motor, and when the luggage is moved to outside of the riding vehicle, the frame is automatically lowered.

According to the above-mentioned configuration, when the loaded luggage is moved to the outside of the riding vehicle, it is necessary to lift the luggage to a position beyond the frame, but a lifting distance can be shortened by automatically lowering the frame.

In the above-mentioned riding vehicle, it is preferable that the frame has an opening portion that allows the luggage to move in a horizontal direction.

According to the above-mentioned configuration, when the loaded luggage is moved to the outside of the riding vehicle, it is not necessary to lift the luggage to the position beyond the frame.

APPENDIX 1

In the above-mentioned riding vehicle, it is preferable that a movable portion provided on the seat stay and configured to switch between the riding state and the cart state slides linearly along the fixing portion provided on the seat stay and connected to the main body portion.

According to the above-mentioned configuration, a movement amount between the riding state and the cart state can be reduced, and the state can be switched with a small momentum.

APPENDIX 2

In the above-mentioned riding vehicle, it is preferable that the riding vehicle is provided with a mechanism that holds the movable portion during switching between the riding state and the cart state.

According to the above-mentioned configuration, a height of the seat can be adjusted according to a body height, and when the luggage is unloaded, the height can be adjusted according to a moving destination.

APPENDIX 3

In the above-mentioned riding vehicle, it is preferable that the riding vehicle has a luggage support that supports a bottom portion of the luggage.

According to the above-mentioned configuration, since the luggage is supported by the luggage support, and movement in the horizontal direction (a direction parallel to an XY plane) is limited by the frame, the luggage can be loaded in a stable state.

APPENDIX 4

In the above-mentioned riding vehicle, it is preferable that a state in which the luggage support is accommodated and a state in which the luggage support supports the luggage are switched in association with a switch provided on the frame.

According to the above-mentioned configuration, when the luggage is loaded, the switch is pressed and the luggage support is ready to support the luggage. When the luggage is removed, the switch returns to an original state, and the luggage support is in an accommodated state. As a result, the luggage support can be switched to a state in which the luggage is supported even when both hands are occupied when the luggage is loaded.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. A riding vehicle comprising:
a main body portion supporting a wheel;
a seat stay erected on the main body portion and configured to select and be switched between a riding state in which a person rides and a cart state in which a person does not ride;
a seat fixed to an upper side of the seat stay;

a frame provided on the seat stay movable with respect to the main body portion and configured to hold luggage in both the riding state and the cart state;
a steering stay erected on the main body portion at an interval with respect to the seat stay in a traveling direction; and
a handle provided on the steering stay, wherein
the frame, in the cart state, exists in a region closer to the handle as compared with that in the riding state.

2. The riding vehicle according to claim 1, wherein
the seat stay is switched between the riding state and the cart state by a link mechanism, and
while the riding state and the cart state are switched, the seat stay passes through a highest reaching point thereof in a vertical direction.

3. The riding vehicle according to claim 1, wherein
a fixing portion provided on the seat stay and connected to the main body portion extends toward the handle.

4. The riding vehicle according to claim 1, wherein
the handle exists on a vertical plane that is perpendicular to the traveling direction and passes through a center of the wheel or on a substantially vertical plane.

5. The riding vehicle according to claim 1, further comprising:
a sensor configured to detect that the luggage is lifted;
a motor configured to raise and lower the frame; and
a control unit configured to control the motor, wherein
when the luggage is moved to outside of the riding vehicle, the frame is automatically lowered.

6. The riding vehicle according to claim 1, wherein
the frame has an opening portion that allows the luggage to move in a horizontal direction.

7. The riding vehicle according to claim 1, wherein
a movable portion provided on the seat stay and configured to slide linearly along a fixing portion provided on the seat stay and connected to the main body portion.

8. The riding vehicle according to claim 7, wherein
the riding vehicle is provided with a mechanism that holds the movable portion provided on the seat stay and configured to switch between the riding state and the cart state during switching between the riding state and the cart state.

9. The riding vehicle according to claim 1, wherein
the riding vehicle has a luggage support that supports a bottom portion of the luggage.

10. The riding vehicle according to claim 9, wherein
a state in which the luggage support is accommodated and a state in which the luggage support supports the luggage are switched in association with a switch provided on the frame.

11. A riding vehicle comprising:
a main body portion supporting a wheel;
a seat stay erected on the main body portion and configured to be switched between a riding state in which a person rides and a cart state in which a person does not ride;
a seat fixed to an upper side of the seat stay;
a frame provided on the seat stay and configured to hold luggage in the riding state and the cart state;
a steering stay erected on the main body portion at an interval with respect to the seat stay in a traveling direction;
a handle provided on the steering stay,
a sensor configured to detect that the luggage is lifted;
a motor configured to raise and lower the frame; and
a control unit configured to control the motor, wherein
the frame, in the cart state, exists in a region closer to the handle as compared with that in the riding state, and
when the luggage is moved to outside of the riding vehicle, the frame is automatically lowered.

12. A riding vehicle comprising:
a main body portion supporting a wheel;
a seat stay erected on the main body portion and configured to be switched between a riding state in which a person rides and a cart state in which a person does not ride;
a seat fixed to an upper side of the seat stay;
a frame provided on the seat stay and configured to hold luggage in the riding state and the cart state;
a steering stay erected on the main body portion at an interval with respect to the seat stay in a traveling direction;
a handle provided on the steering stay; and
a movable portion provided on the seat stay and configured to slide linearly along a fixing portion provided on the seat stay and connected to the main body portion, wherein
the frame, in the cart state, exists in a region closer to the handle as compared with that in the riding state.

* * * * *